US012761856B2

(12) United States Patent
Chan et al.

(10) Patent No.: US 12,761,856 B2
(45) Date of Patent: Oct. 13, 2026

(54) IMAGE PROCESSING APPARATUS AND IMAGE PROCESSING METHOD

(71) Applicant: Realtek Semiconductor Corporation, Hsinchu (TW)

(72) Inventors: Chun-Chieh Chan, Hsinchu (TW); Yu-Le Shen, Hsinchu (TW); Hung-Shao Chen, Hsinchu (TW); Wen-Hsia Kung, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 177 days.

(21) Appl. No.: 18/773,589

(22) Filed: Jul. 16, 2024

(65) Prior Publication Data

US 2025/0123788 A1 Apr. 17, 2025

(30) Foreign Application Priority Data

Oct. 11, 2023 (TW) ................................ 112138824

(51) Int. Cl.

*G06F 3/14* (2006.01)
*G06T 3/4038* (2024.01)
*G06T 3/60* (2024.01)

(52) U.S. Cl.

CPC .......... *G06F 3/1446* (2013.01); *G06T 3/4038* (2013.01); *G06T 3/60* (2013.01)

(58) Field of Classification Search

None

See application file for complete search history.

(56) References Cited

U.S. PATENT DOCUMENTS

| | | | | |
|---|---|---|---|---|
| 9,787,937 | B1 * | 10/2017 | Hung | H04N 7/0122 |
| 11,481,176 | B2 * | 10/2022 | Takaya | G09G 5/393 |
| 2014/0119675 | A1 * | 5/2014 | Kim | G06T 3/40 382/299 |
| 2015/0098664 | A1 * | 4/2015 | Minamihara | G06T 3/4038 382/284 |
| 2019/0018637 | A1 * | 1/2019 | Cheon | G06F 3/1446 |
| 2021/0065651 | A1 * | 3/2021 | Chen | G06T 1/60 |
| 2022/0012000 | A1 * | 1/2022 | Thyagarajan | G06F 3/147 |

(Continued)

FOREIGN PATENT DOCUMENTS

| | | |
|---|---|---|
| TW | 201228375 A | 7/2012 |
| TW | 202218434 A | 5/2022 |

*Primary Examiner* — Andrew G Yang

(74) *Attorney, Agent, or Firm* — CKC & Partners Co., LLC

(57) ABSTRACT

An image processing apparatus includes an output circuit, a processing circuit and a receiving circuit. The output circuit includes connection ports, and is configured to perform handshakes through connected ones of connection ports to respectively obtain display capability data through connected ones of connection ports. The output circuit is further configured to output picture data through connected ones of connection ports, respectively. The processing circuit, coupled with the output circuit, is configured to determine a stitching mode resolution according to display capability data. The receiving circuit, coupled with the processing circuit, is configured to perform handshakes according to the stitching mode resolution, in order to obtain a first image having the stitching mode resolution. The processing circuit is configured to slice the first image into sub-images corresponding to the display capability data, and to generate picture data including the sub-images.

14 Claims, 6 Drawing Sheets

(56) References Cited

U.S. PATENT DOCUMENTS

| | | | | |
|---|---|---|---|---|
| 2023/0246148 | A1 * | 8/2023 | Lee | G06F 3/1446<br>257/79 |
| 2023/0324952 | A1 * | 10/2023 | Martinson | G06F 1/1607<br>361/679.21 |
| 2024/0221702 | A1 * | 7/2024 | Yamamoto | G09G 5/006 |
| 2025/0103269 | A1 * | 3/2025 | Rothschild | G06F 3/1407 |

* cited by examiner

IMAGE PROCESSING APPARATUS AND IMAGE PROCESSING METHOD

RELATED APPLICATIONS

This application claims priority to Taiwan Application Serial Number 112138824, filed Oct. 11, 2023, which is herein incorporated by reference.

BACKGROUND

Technical Field

The present disclosure relates to an image processing technology. More particularly, the present disclosure relates to an image processing apparatus and an image processing method capable of optimizing a stitched image automatically.

Description of Related Art

As modern consumers' demands for audio and video playback continue to increase, large-sized image applications can be seen everywhere in daily life, for example, electronic menus, video walls, driving simulation games, etc. The cost of a large-sized display device is much higher than the solution of using multiple small-sized display devices to stitch, and large-sized display devices also have a higher failure rate. Therefore, the current mainstream is to use multiple small-sized display devices to provide a stitched picture. However, the amount of output terminals of the video signal source may not be sufficient to drive the required amount of small-sized display devices, and the transmission interface of the video signal source may not be compatible with some small-sized display devices.

For the foregoing reason, there is a need to solve the above-mentioned problems by providing an image processing apparatus and an image processing method.

SUMMARY

The present disclosure provides an image processing apparatus, which includes an output circuit, a processing circuit, and a receiving circuit. The output circuit includes multiple connection ports, and is configured to perform handshakes through connected ones of the multiple connection ports to respectively obtain multiple display capability data through the connected ones of the multiple connection ports. The output circuit is further configured to output multiple picture data through the connected ones of the multiple connection ports, respectively. The processing circuit is coupled with the output circuit, and is configured to determine a stitching mode resolution according to the multiple display capability data. The receiving circuit is coupled with the processing circuit, and is configured to perform handshakes according to the stitching mode resolution in order to obtain a first image having the stitching mode resolution. The processing circuit is configured to slice the first image into multiple sub-images respectively corresponding to the multiple display capability data, and is configured to generate the multiple picture data respectively including the multiple sub-images.

The present disclosure also provides an image processing method. The image processing method includes the following steps: performing handshakes through connected ones of multiple connection ports of an output circuit to respectively obtain multiple display capability data through the connected ones of the multiple connection ports; determining a stitching mode resolution according to the multiple display capability data through a processing circuit, in which the processing circuit is coupled with the output circuit; performing handshakes according to the stitching mode resolution through a receiving circuit in order to obtain a first image having the stitching mode resolution; slicing the first image into multiple sub-images respectively corresponding to the multiple display capability data through the processing circuit so as to generate multiple picture data respectively including the multiple sub-images; and outputting the multiple picture data through the connected ones of the multiple connection ports, respectively.

The above image processing apparatus and image processing method can automatically optimize the stitched image according to the amount and positioning methods of the display devices.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
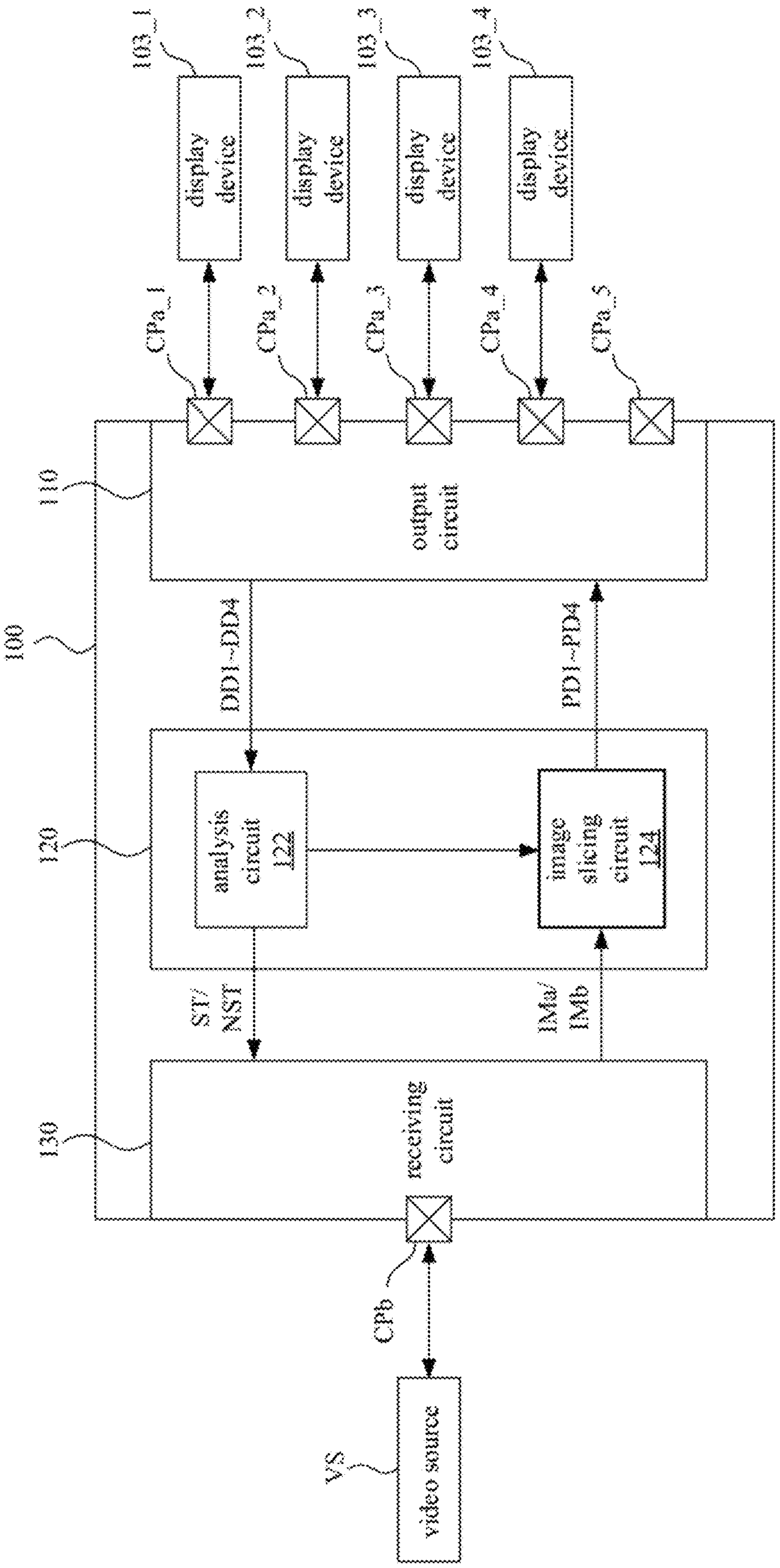
FIG. 1 is a simplified functional block diagram illustrating an image processing apparatus according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts or method flow.

Reference is made to FIG. 1, which is a simplified functional block diagram illustrating an image processing apparatus 100 according to one embodiment of the present disclosure. The image processing apparatus 100 includes an output circuit 110, a processing circuit 120, and a receiving circuit 130. The image processing apparatus 100 is configured to be coupled with a video source VS and display devices 103_1-103_4. The video source VS can transmit a single image to the image processing apparatus 100 in a single-stream transport mode. The image processing apparatus 100 is configured to automatically slice the single image and allocate them to the display devices 103_1-103_4 according to an arrangement method of the display devices 103_1-103_4, so as to generate an optimized stitched picture. In some embodiments, the video source VS can be implemented by a personal computer, a set-top box, or other suitable electronic devices that can generate image data.

The output circuit 110 includes multiple connection ports CPa_1-CPa_5. Each of the connection ports CPa_1-CPa_5 can be configured to be communicatively connected with a display device. For example, the connection ports CPa_1-CPa_4 are communicatively connected with the display devices 103_1-103_4 respectively, that is, the connection ports CPa_1-CPa_4 are in a connected state. The output circuit 110 is configured to perform handshakes with the display devices 103_1-103_4 through the connected connection ports CPa_1-CPa_4, so as to respectively obtain multiple display capability data DD1-DD4 from the display devices 103_1-103_4 through the connected connection ports CPa_1-CPa_4. The output circuit 110 is further configured to respectively output multiple picture data (not shown in the figure) to the display devices 103_1-103_4 through the connected connection ports CPa_1-CPa_4. The multiple picture data respectively include multiple sub-images PD1-PD4. In some embodiments, each of the display capability data DD1-DD4 includes: a pose, a relative positional relationship with other display devices, a size, a supported resolution, or any combination thereof of its corresponding display device. The aforementioned "pose" includes three-dimensional spatial coordinates and/or rotation angle(s) on one or more coordinate axes of the display device.

The processing circuit 120 is coupled with the output circuit 110, and is configured to determine a stitching mode resolution ST according to the display capability data DD1-DD4. The receiving circuit 130 is coupled with the processing circuit 120, and is configured to receive the stitching mode resolution ST from the processing circuit 120. The receiving circuit 130 is further communicatively connected with the video source VS through one or more connection ports (to simplify matters, FIG. 1 only depicts one connection port CPb of the receiving circuit 130). The receiving circuit 130 will perform handshakes with the video source VS according to the stitching mode resolution ST. For example, the receiving circuit 130 can transmit the stitching mode resolution ST to the video source VS during the handshaking process. After the handshakes with the video source VS is completed, the receiving circuit 130 is configured to obtain a single first image IMa having the stitching mode resolution ST returned by the video source VS. The processing circuit 120 is configured to slice the first image IMa into the multiple sub-images PD1-PD4 respectively corresponding to the display capability data DD1-DD4, and is configured to generate the multiple picture data respectively including the multiple sub-images PD1-PD4.

In some embodiments, each of the connection ports CPa_1-CPa_4 and the connection port CPb is one of the following: a universal serial bus Type-C (USB Type-C), a display port, a high-definition multimedia interface (HDMI), and a mobile industry processor interface (MIPI). It should be understood that an amount of the connection ports CPa_1-CPa_5 is only an embodiment taken for example, and is not intended to limit the scope of the present disclosure.

Figure 2:
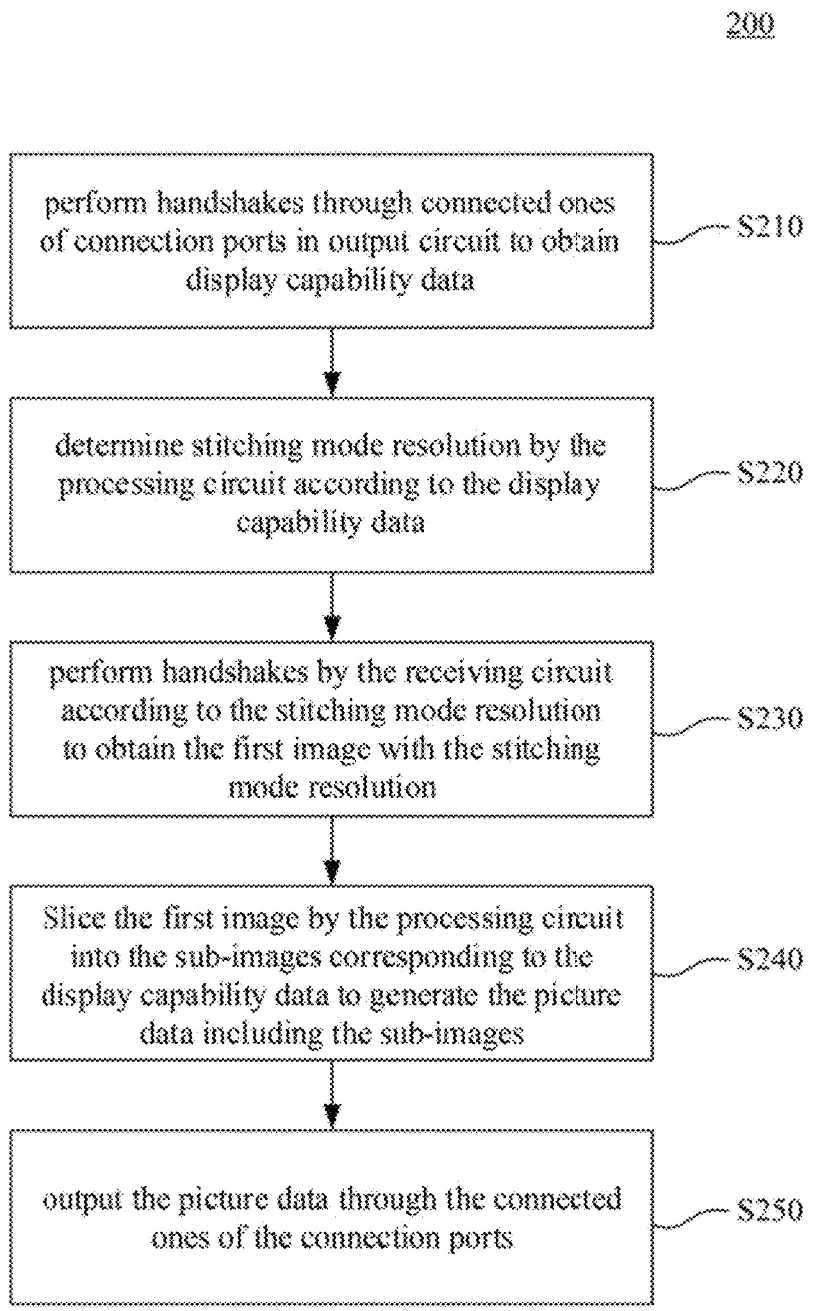
FIG. 2 is a flowchart illustrating an image processing method according to one embodiment of the present disclosure.

FIG. 2 is a flowchart illustrating an image processing method 200 according to one embodiment of the present disclosure. In step S210, the output circuit 110 respectively performs handshakes with the display devices 103_1-103_4 through the connected connection ports CPa_1-CPa_4 to obtain the display capability data DD1-DD4 by using the connected connection ports CPa_1-CPa_4 of its own.

Figure 3:
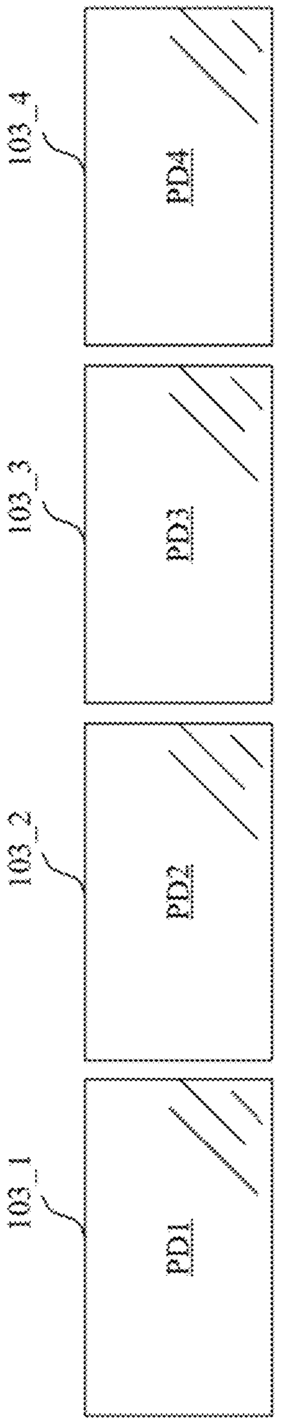
FIG. 3 is a schematic diagram illustrating display devices arranged to form a rectangular stitched picture according to one embodiment of the present disclosure.
Figure 4:
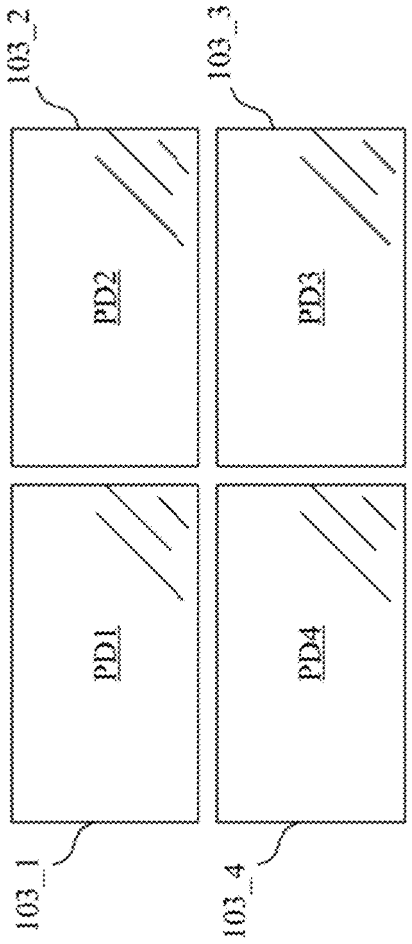
FIG. 4 is a schematic diagram illustrating display devices arranged to form a rectangular stitched picture according to another embodiment of the present disclosure.

Reference is further made to FIG. 3 and FIG. 4. FIG. 3 and FIG. 4 depict schematic diagrams of the display devices 103_1-103_4 arranged to form rectangular stitched pictures according to some embodiments of the present disclosure. In step S220, an analysis circuit 122 of the processing circuit 120 receives the display capability data DD1-DD4 from the output circuit 110, and determines the stitching mode resolution ST according to the display capability data DD1-DD4.

For example, in the embodiment of FIG. 3, the analysis circuit 122 obtains the relative positional relationships of the display devices 103_1-103_4 according to the display capability data DD1-DD4 to further learn that the display devices 103_1-103_4 are arranged as a single-row multi-column matrix of FIG. 3 (for example, a 1×N matrix, where N is a positive integer greater than or equal to 2). The analysis circuit 122 can further obtain the multiple supported resolutions of the display devices 103_1-103_4 according to the display capability data DD1-DD4. The analysis circuit 122 will set an amount of horizontal pixels of the stitching mode resolution ST to N times as many as an amount of horizontal pixels of a maximum or a minimum among the multiple supported resolutions of the display devices 103_1-103_4. For example, when the maximum of the multiple supported resolutions is 2K (that is, 1920×1080), the stitching mode resolution ST is 7680×1080.

For another example, in the embodiment of FIG. 4, the analysis circuit 122 obtains the relative positional relationships of the display devices 103_1-103_4 according to the display capability data DD1-DD4 to further learn that the display devices 103_1-103_4 are arranged as a multi-row multi-column matrix of FIG. 4 (for example, an M×N matrix, where M and N are positive integers greater than or equal to 2). The analysis circuit 122 can further obtain the multiple supported resolutions of the display devices 103_1-103_4 according to the display capability data DD1-DD4. The analysis circuit 122 will set the amount of horizontal pixels of the stitching mode resolution ST to N times as many as the amount of horizontal pixels of the maximum or the minimum among the multiple supported resolutions of the display devices 103_1-103_4, and set an amount of vertical pixels of the stitching mode resolution ST to M times as many as an amount of vertical pixels of the maximum or the minimum among the multiple supported resolutions of the display devices 103_1-103_4. For example, when the maximum of the multiple supported resolutions is 2560×1440, the stitching mode resolution ST is 5120×2880.

In summary, an amount of pixels along at least one axis in the stitching mode resolution ST is N times as dense as an amount of pixels along a corresponding axis in a maximal supported resolution or a minimal supported resolution. N is a positive integer greater than or equal to 2.

Then, in step S230 of FIG. 2, the receiving circuit 130 receives the stitching mode resolution ST from the analysis circuit 122 and performs the handshakes with the video source VS according to the stitching mode resolution ST, so as to obtain the first image IMa having the stitching mode resolution ST returned by the video source VS.

In step S240, the image slicing circuit 124 of the processing circuit 120 is configured to receive the first image IMa from the receiving circuit 130, and is configured to slice the first image IMa into the multiple sub-images PD1-PD4 respectively corresponding to the display capability data DD1-DD4. In addition, the image slicing circuit 124 is further configured to generate the multiple picture data respectively including the multiple sub-images PD1-PD4.

After that, in step S250, the output circuit 110 receives the multiple picture data from the image slicing circuit 124 and outputs the multiple picture data respectively through the connected connection ports CPa_1-CPa_4, so that the display devices 103_1-103_4 display the sub-images PD1-PD4 correspondingly.

In the following, how the image slicing circuit 124 generates the sub-images PD1-PD4 in step S240 in different embodiments is described. It is noted that, in the following description multiple parameters (for example, image content and resolution) of the sub-images PD1-PD4 are determined by the analysis circuit 122 according to the display capability data DD1-DD4 in step S220, and these parameters are stored in a memory circuit (not shown in the figure) of the image slicing circuit 124. However, the present disclosure is not limited in this regard. In some embodiments, the image slicing circuit 124 can receive the display capability data DD1-DD4 from the analysis circuit 122 in step S240, and determine the parameters of the sub-images PD1-PD4 by itself.

In some embodiments, the analysis circuit 122 determines the resolution of each of the multiple sub-images PD1-PD4 according to an amount of the display devices 103_1-103_4 represented by the display capability data DD1-DD4 (for example, 4), and according to the relative positional relationships of the display devices 103_1-103_4 recorded in the display capability data DD1-DD4. For example, in the embodiment of FIG. 3, the display capability data DD1-DD4 record that the relative positional relationships of the display devices 103_1-103_4 correspond to a 1×4 matrix, so the analysis circuit 122 will control the image slicing circuit 124 to slice the first image IMa having a resolution of 7680×1080 into the 4 sub-images PD1-PD4 respectively having a resolution of 2K (that is, 1920×1080).

In some embodiments, the analysis circuit 122 can further determine whether to further adjust the resolutions of the sub-images PD1-PD4 or not after slicing according to the supported resolutions of the display devices 103_1-103_4 recorded in the display capability data DD1-DD4. For example, when the supported resolutions of the display devices 103_1-103_4 are respectively 2K, HD, HD, and 2K, the analysis circuit 122 can control the image slicing circuit 124 to reduce the resolutions of the sub-images PD1 and PD2 from 2K to HD, and vice versa.

In some embodiments, the analysis circuit 122 will control the image slicing circuit 124 to slice the first image IMa according to the relative positional relationships of the display devices 103_1-103_4 recorded in the display capability data DD1-DD4. For example, in the embodiment of FIG. 3, the analysis circuit 122 learns that the display devices 103_1-103_4 are arranged in the 1×4 matrix from left to right according to the relative positional relationships of the display devices 103_1-103_4 in the display capability data DD1-DD4, so the image slicing circuit 124 will slice the first image IMa into the sub-images PD1-PD4 from left to right. As a result, a relative positional relationship of the sub-images PD1-PD4 in the first image IMa is the same as a relative positional relationship of the display devices 103_1-103_4.

Figure 5:
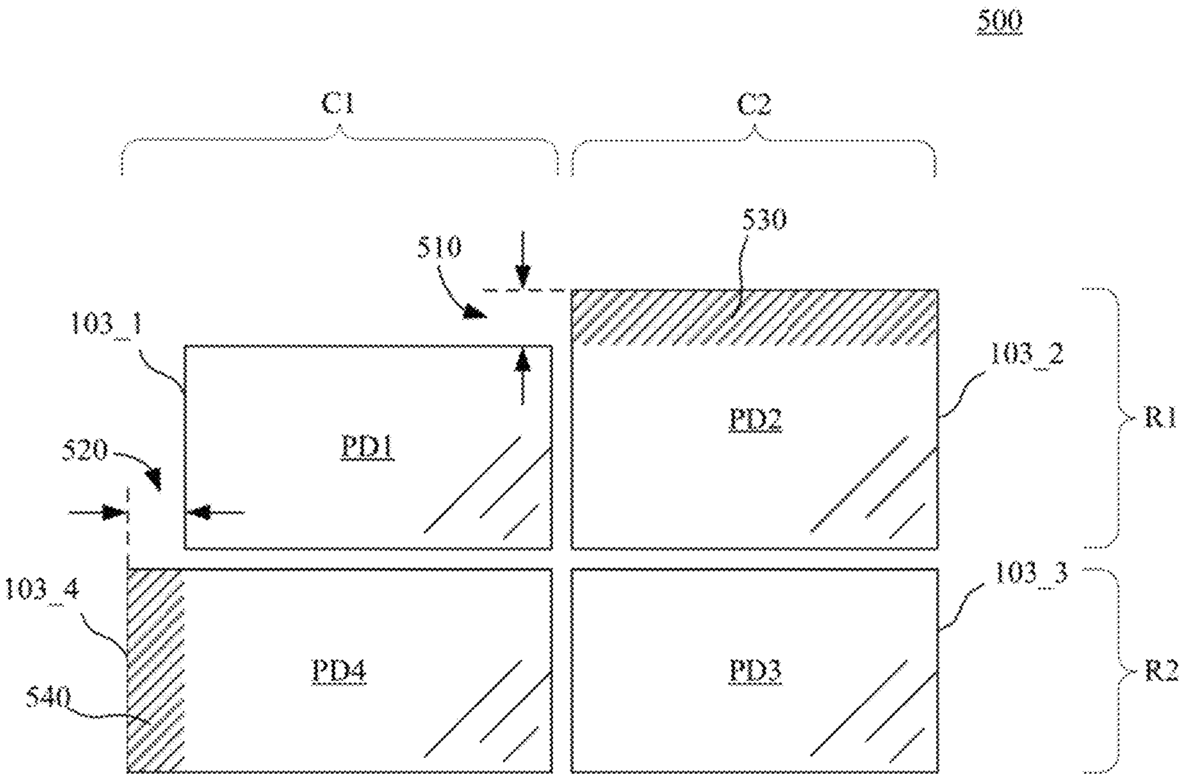
FIG. 5 is a schematic diagram illustrating display devices arranged to form a rectangular stitched picture according to some embodiments of the present disclosure.

Reference is further made to FIG. 5, which is a schematic diagram illustrating the display devices 103_1-103_4 arranged to form a rectangular stitched picture according to some embodiments of the present disclosure. In the embodiment of FIG. 5, the analysis circuit 122 learns that the display devices 103_1-103_4 are arranged in a 2×2 matrix 500 according to the relative positional relationships recorded in the display capability data DD1-DD4. Additionally, the analysis circuit 122 further learns heights of rows R1-R2 and widths of columns C1-C2 in the matrix according to sizes of the display devices 103_1-103_4 recorded in the display capability data DD1-DD4.

The analysis circuit 122 will determine whether a height difference 510 between two adjacent rows (for example, the rows R1-R2) in the matrix 500 exceeds a height threshold (for example, 2 inches) or not and determine whether a width difference 520 between two adjacent columns (for example, the columns C1-C2) in the matrix 500 exceeds a width threshold (for example, 2 inches) or not, so as to determine whether to further adjust the resolutions of sub-images PD1~PD4 or not after slicing. In greater detail, as shown in FIG. 5, under the circumstances that the analysis circuit 122 determines that (1). the display devices 103_1-103_4 are arranged in the matrix 500 so the sub-images PD1-PD4 are used to form the rectangular stitched image, and (2). the heights of the two adjacent rows R1-R2 in the matrix 500 are different and the height difference 510 is lower than the height threshold, the analysis circuit 122 controls the image slicing circuit 124 to reduce a vertical resolution of the sub-image PD2 of the row R1. As a result, a black area 530 will be displayed in part of the display device 103_2 when the stitched picture is displayed.

Similarly, under the circumstances that the analysis circuit 122 determines that (1). the display devices 103_1-103_4 are arranged in the matrix 500 so the sub-images PD1-PD4 are used to form the rectangular stitched picture, and (2). the widths of the two adjacent columns C1-C2 in the matrix 500 are different and the width difference 520 is lower than the width threshold, the analysis circuit 122 controls the image slicing circuit 124 to reduce a horizontal resolution of the sub-image PD4 of the column C1. As a result, a black area 540 will be displayed in part of the display device 103_4 when the stitched picture is displayed.

In some other embodiments, under the circumstances that the analysis circuit 122 determines that (1) the display devices 103_1-103_4 are arranged in the matrix 500 so the sub-images PD1-PD4 are used to form the rectangular stitched image, and (2) the height difference 510 between the adjacent rows R1-R2 in the matrix 500 is higher than or equal to the height threshold or the width difference 520 between the adjacent columns C1-C2 in the matrix 500 is higher than or equal to the width threshold, the analysis circuit 122 does not perform steps S220, S230, and S240 of FIG. 2. That is to say, the analysis circuit 122 will give up making the display devices 103_1-103_4 form the rectangular stitched image.

In greater detail, after step S210 is completed, the analysis circuit 122 will generate a non-stitching mode resolution NST, and sends the non-stitching mode resolution NST to the receiving circuit 130. In some embodiments, the non-stitching mode resolution NST may be the largest one or smallest one among the supported resolutions of the display devices 103_1-103_4. Then, the receiving circuit 130 uses the non-stitching mode resolution NST to perform handshakes with the video source VS to obtain a single second image IMb having the non-stitching mode resolution NST returned by the video source VS. The image slicing circuit 124 omits slicing the second image IMb, and generates multiple display data respectively including the second image IMb. Next, after aforementioned steps are completed, the output circuit 110 will perform step S250 to output these display data to the display devices 103_1-103_4, so that the display devices 103_1-103_4 provide display pictures with the same content.

Figure 6:
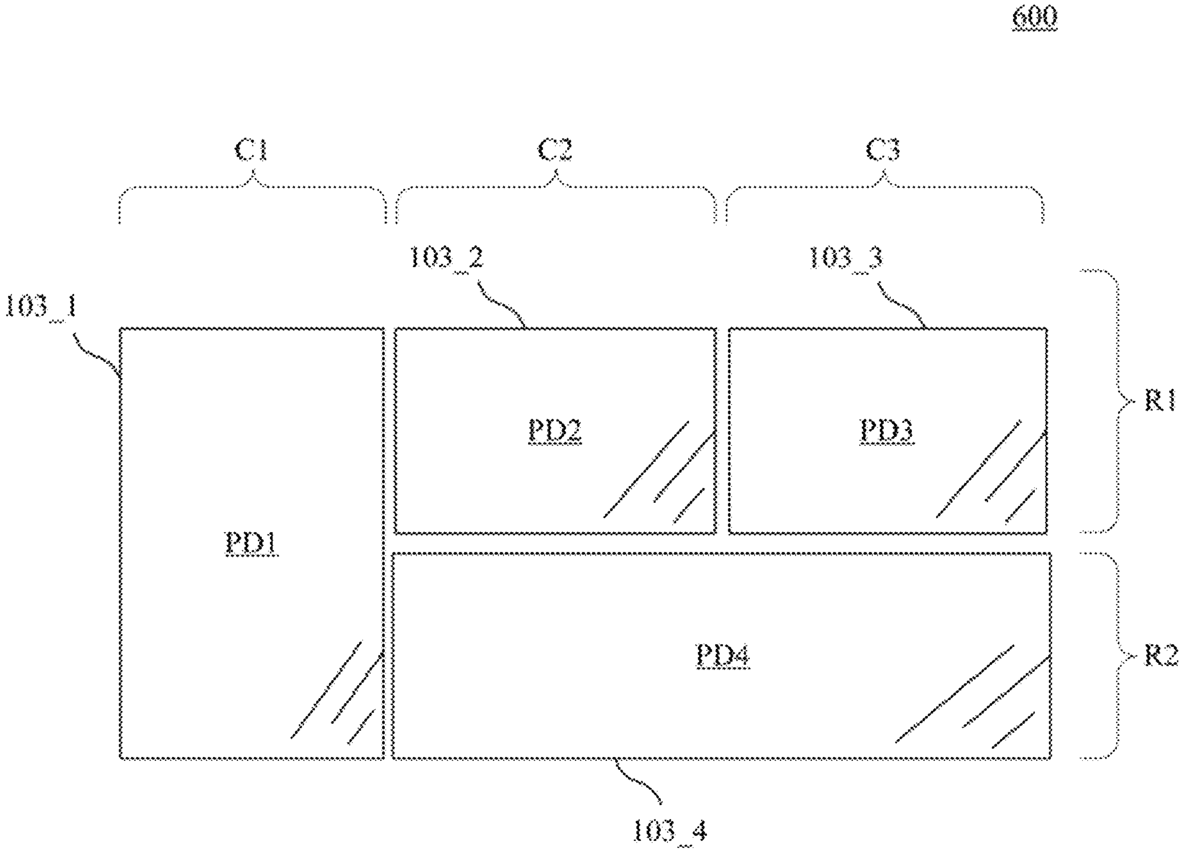
FIG. 6 is a schematic diagram illustrating display devices arranged to form a rectangular stitched picture according to some embodiments of the present disclosure.

Reference is further made to FIG. 6. FIG. 6 is a schematic diagram illustrating the display devices 103_1-103_4 arranged to form a rectangular stitched picture according to some embodiments of the present disclosure. In the present embodiment, the display devices 103_1-103_4 are arranged in an asymmetric matrix 600. However, the above-mentioned adjustment of the resolutions of the sub-images PD1-PD4 according to the height threshold and the width threshold described with reference to FIG. 5 is applicable to the embodiment of FIG. 6. For brevity, a description in this regard is not provided. It is noted that, in the embodiment of FIG. 6, the analysis circuit 122 will determine positioning states of the display devices 103_1-103_4 according to the poses of the display devices 103_1-103_4 recorded in the display capability data DD1-DD4 (for example, a rotation angle on a coordinate axis (not shown in the figure) perpendicular to the drawing of FIG. 6), so as to control the image slicing circuit 124 to rotate one or more of the sub-images PD1-PD4. For example, when the analysis circuit 122 determines that the display device 103_1 is in a vertical state and rotated 90° according to the poses of the display devices 103_1-103_4, the analysis circuit 122 will control the image slicing circuit 124 to further rotate the sub-image PD1 90° after image slicing. In other words, the image slicing circuit 124 will use the rotation angle and rotation direction as the pose of the corresponding display device when rotating the sub-image.

Figure 7:
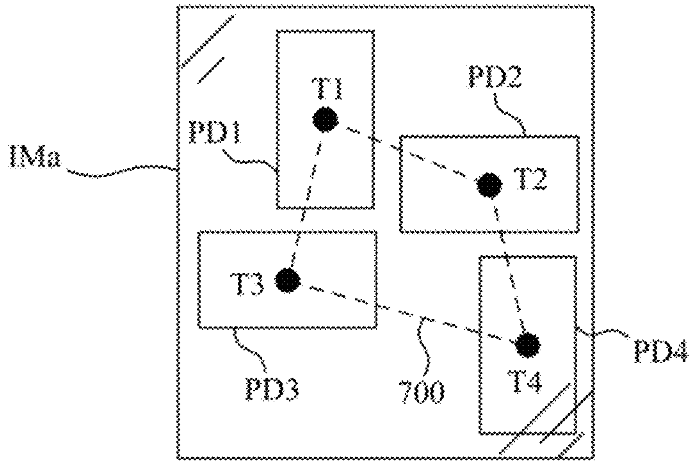
FIG. 7 is a schematic diagram illustrating positions of sub-images in a first image according to some embodiments of the present disclosure.
Figure 8:
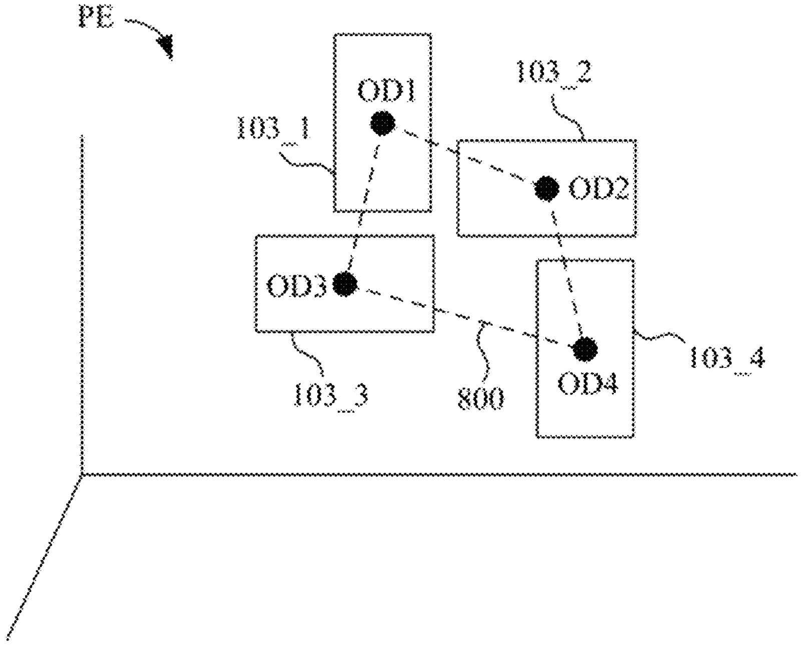
FIG. 8 is a schematic diagram illustrating an arrangement method of display devices in a physical environment.

Reference is further made to FIG. 7 and FIG. 8. FIG. 7 is a schematic diagram illustrating positions of the sub-images PD1-PD4 in the first image Ima according to some embodiments. FIG. 8 is a schematic diagram illustrating an arrangement method of the display devices 103_1-103_4 in a physical environment PE according to some embodiments. In embodiments shown in FIG. 7 and FIG. 8, the display devices 103_1-103_4 are used to form an irregular (or non-rectangular) stitched image, and the display devices 103_1-103_4 may not be adjacent. The analysis circuit 122 obtains the poses of the display devices 103_1-103_4 from the display capability data DD1-DD4. The poses include spatial coordinates OD1-OD4 and rotation angles (for example, rotation angles on a coordinate axis (not shown in the figure) perpendicular to the drawings of FIGS. 7-8) of the display devices 103_1-103_4 in the physical environment PE. In some embodiments, the aforementioned "spatial coordinates" refer to coordinates of center points of the display devices 103_1-103_4 in the physical environment PE.

The analysis circuit 122 is configured to control the image slicing circuit 124 to slice positions of the first image IMa according to the poses. For example, multiple center points T1-T4 of the sub-images PD1-PD4 form a first shape 700 in the first image IMa, the spatial coordinates OD1-OD4 of the display devices 103_1-103_4 form a second shape 800 in the physical environment PE, and the first shape 700 and the second shape 800 are in similar shapes. For another example, a figure arranged by the sub-images PD1-PD4 in the first image IMa is similar to a figure arranged by the display devices 103_1-103_4 in the physical environment PE. It is noted that the analysis circuit 122 can control the image slicing circuit 124 to rotate the sub-images PD1 and PD4 after image slicing according to the method similar to that shown in FIG. 6, so that the vertical display devices 103_1 and 103_4 can display normally. To simplify matters, a description in this regard is not provided.

It is understood that, the video source VS in aforesaid embodiments is not required to support the multi-stream transport mode and the video source VS is also not required to have multiple output ports, the image processing apparatus 100 and the image processing method 200 is able automatically optimize the stitched image according to the amount and positioning methods of the display devices 103_1-103_4. As a result, the image processing apparatus 100 and the image processing method 200 can reduce the difficulty for users in setting up a multi-screen system.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. An image processing apparatus, comprising:

an output circuit, comprising a plurality of connection ports, the output circuit being configured to perform handshakes through connected ones of the connection ports to obtain a plurality of display capability data respectively through the connected ones of the connection ports, and being configured to output a plurality of picture data through the connected ones of the connection ports respectively;

a processing circuit, coupled with the output circuit, and the processing circuit being configured to determine a stitching mode resolution according to the display capability data; and a receiving circuit, coupled with the processing circuit, and the receiving circuit being configured to perform handshakes according to the stitching mode resolution in order to obtain a first image having the stitching mode resolution;

wherein the processing circuit is configured to slice the first image into a plurality of sub-images corresponding to the display capability data, and is configured to generate the picture data comprising the sub-images, wherein each of the display capability data comprises a pose, a relative positional relationship regarding to other display devices, a size, a supported resolution, or any combination thereof of a corresponding display device, wherein the display capability data comprise a plurality of sizes of display devices, in response to a condition, determined by the processing circuit determines through the display capability data, that (1) the display devices are configured to be arranged in a matrix and the sub-images are used to form a rectangular stitched image, and (2) a height difference between a first row and a second row adjacent to each other in the matrix is higher than or equal to a height threshold, or a width difference between a first column and a second column adjacent to each other in the matrix is higher than or equal to a width threshold:

the receiving circuit uses a non-stitching mode resolution to perform handshakes so as to obtain a second image data, wherein the second image data comprises a second image having the non-stitching mode resolution, the processing circuit is configured to generate the picture data respectively comprising the second image.

2. The image processing apparatus of claim 1, wherein the processing circuit is configured to determine a resolution of each of the sub-images according to an amount of display devices represented by the display capability data and the relative positional relationship regarding to the other display devices comprised in each of the display capability data.

3. The image processing apparatus of claim 1, wherein the display capability data respectively comprise a plurality of poses of display devices, each of the poses comprises a plurality of spatial coordinates;

wherein a plurality of center points of the sub-images form a first shape in the first image, the spatial coordinates form a second shape, and the first shape and the second shape are in similar shapes.

4. The image processing apparatus of claim 3, wherein the processing circuit rotates at least one of the sub-images according to the poses.

5. The image processing apparatus of claim 1, wherein the display capability data are configured to record a relative positional relationship between display devices;

wherein a relative positional relationship between the sub-images in the first image is the same as the relative positional relationship between the display devices.

6. The image processing apparatus of claim 1, wherein in response to a condition, determined by the processing circuit through the display capability data, that the first row and the second row adjacent to each other in the matrix have different heights, and the height difference between the first row and the second row is lower than the height threshold:

the processing circuit reduces resolutions of one or more of the sub-images of one of the first row and the second row; and in response to a condition, determined by the processing circuit through the display capability data, that the first column and the second column adjacent to each other in the matrix have different widths, and the width difference between the first column and the second column is lower than the width threshold:

the processing circuit reduces resolutions of one or more of the sub-images of one of the first column and the second column.

7. The image processing apparatus of claim 1, wherein the display capability data comprise a plurality of supported resolutions of display devices, the stitching mode resolution is N times as dense as a maximum or a minimum among the supported resolutions, wherein N is a positive integer greater than or equal to 2.

8. An image processing method, comprising:

performing handshakes through connected ones of connection ports in an output circuit to obtain a plurality of display capability data respectively through the connected ones of the connection ports;

determining a stitching mode resolution according to the display capability data through a processing circuit, wherein the processing circuit is coupled with the output circuit;

performing handshakes according to the stitching mode resolution through a receiving circuit to obtain a first image having the stitching mode resolution;

slicing the first image into a plurality of sub-images respectively corresponding to the display capability data through the processing circuit to generate a plurality of picture data comprising the sub-images; and outputting the picture data through the connected ones of the connection ports respectively, wherein each of the display capability data comprises a pose, a relative positional relationship regarding to other display devices, a size, a supported resolution, or any combination thereof of a corresponding display device, wherein the display capability data comprises sizes of display devices, and the image processing method further comprises:

in response to a condition, determined by the processing circuit determines through the display capability data, that (1) the display devices are configured to be arranged in a matrix and the sub-images are used to form a rectangular stitched image, and (2) a height difference between a first row and a second row adjacent to each other in the matrix is higher than or equal to a height threshold, or a width difference between a first column and a second column adjacent to each other in the matrix is higher than or equal to a width threshold:

performing handshakes by the receiving circuit using a non-stitching mode resolution to obtain a second image data, wherein the second image data comprises a second image having the non-stitching mode resolution; and generating, by the processing circuit, the picture data comprising the second image.

9. The image processing method of claim 8, wherein slicing the first image into the sub-images respectively corresponding to the display capability data comprises:

determining a resolution of each of the sub-images according to an amount of display devices represented by the display capability data and the relative positional relationship regarding to the other display devices recorded in the display capability data.

10. The image processing method of claim 8, wherein the display capability data comprise poses of display devices, the poses comprise a plurality of spatial coordinates respectively, wherein slicing the first image into the sub-images respectively corresponding to the display capability data comprises:

allocating the center points of the sub-images, so as to make a first shape formed by center points of the sub-images in the first image in a similar shape to a second shape formed by the spatial coordinates.

11. The image processing method of claim 10, wherein slicing the first image into the sub-images respectively corresponding to the display capability data further comprises:

rotating at least one of the sub-images according to the poses.

12. The image processing method of claim 8, wherein the display capability data are configured to record a relative positional relationship between display devices;

wherein slicing the first image into the sub-images respectively corresponding to the display capability data comprises:

allocating the sub-images in the first image, so as to make a relative positional relationship between the sub-images in the first image to be the same as the relative positional relationship between the display devices.

13. The image processing method of claim 8, wherein the image processing method further comprises:

in response to a condition, determined by the processing circuit through the display capability data, that the first row and the second row adjacent to each other in the matrix have different heights, and the height difference between the first row and the second row is lower than the height threshold:

reducing, by the processing circuit, a resolution of one of the sub-images on the first row or the second row; and in response to a condition, determined by the processing circuit through the display capability data, that the first column and a second column adjacent to each other in the matrix have different widths, and a width difference between the first column and the second column is lower than a width threshold:

reducing, by the processing circuit, a resolution of one of the sub-images on the first column or the second column.

14. The image processing method of claim 8, wherein the display capability data comprise a plurality of supported resolutions of display devices, the stitching mode resolution is N times as dense as a maximum or a minimum among the supported resolutions, wherein N is a positive integer greater than or equal to 2.

* * * * *